3,433,248
MECHANICAL DISPENSING MEANS FOR
CRYOGENIC LIQUIDS
Albert V. Hedstrom, Pinole, Calif., assignor to Almac Cryogenics, Inc., Oakland, Calif., a corporation of California
Filed Mar. 13, 1967, Ser. No. 622,715
U.S. Cl. 137—386                                4 Claims
Int. Cl. F16k 21/18

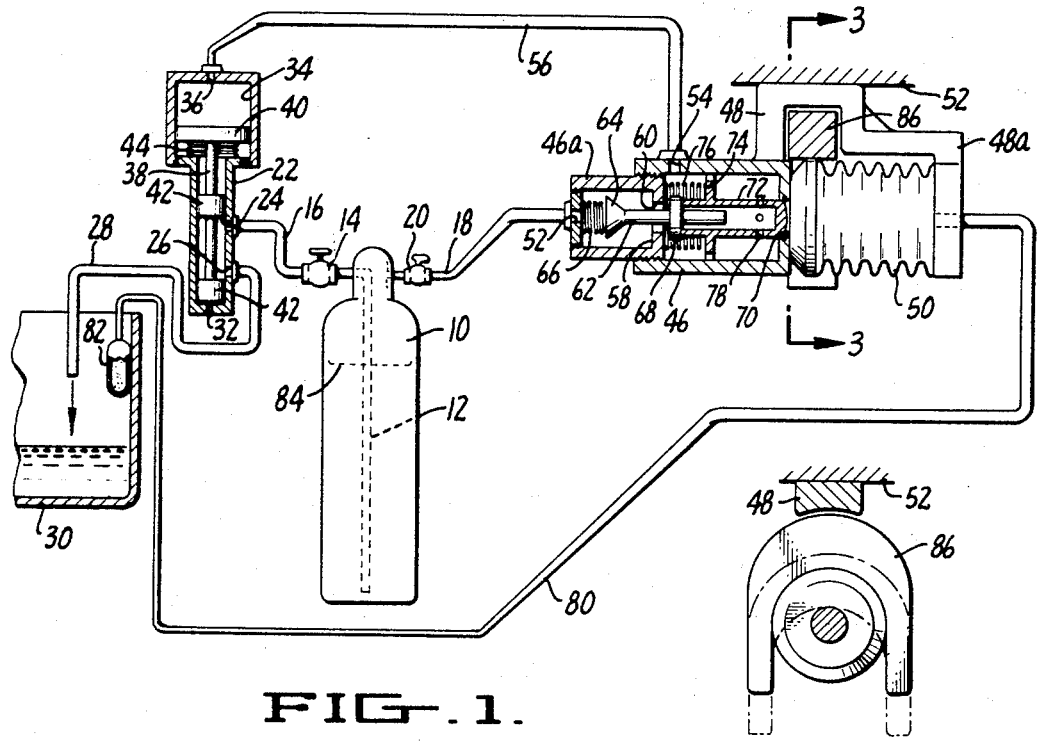
FIG. 1.
FIG. 3.
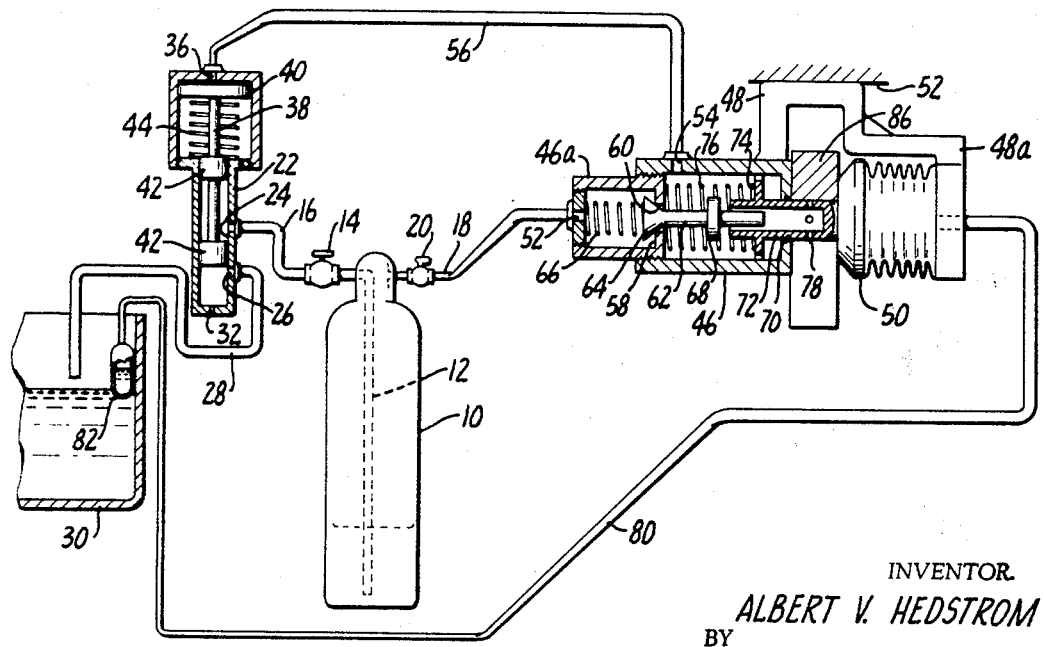
FIG. 2.
INVENTOR.
ALBERT V. HEDSTROM
BY Naylor & Neal
ATTORNEYS United States Patent Office 3,433,248
Patented Mar. 18, 1969

ABSTRACT OF THE DISCLOSURE

Apparatus for filling vessels to a predetermined level with a cryogenic liquid where the valve means includes a pneumatic servo system and an optionally usable automatic latch. The latch prevents automatic repeat flow of the cryogenic liquid, and when the latch is removed the apparatus operates automatically and continuously to maintain a constant liquid level of the cryogenic liquid in the vessel being filled.

Summary of invention

A variety of electrically operated devices are available for dispensing cryogenic liquids such as liquid nitrogen from pressurized containers, but at the present time no dispensing apparatus is available which is operated purely mechanically and is satisfactory for dispensing cryogenic liquids with the reliability necessary to the use of these materials. In accordance with this invention a purely mechanical dispensing arrangement of this type is provided, and the apparatus operates automatically to turn off the flow of cryogenic liquid when a vessel is filled with the liquid to a predetermined level. Automatic interruption of the flow of liquid is provided by mounting in the vessel at the predetermined liquid level the end of a closed tube, the other end of which communicates with the interior of an expandable bellows. The tube is filled with a gas such as carbon dioxide or the vapors of the cryogenic liquid having a boiling point between the boiling point of the cryogenic liquid and ambient temperature. Filling of the vessel with cryogenic liquid continues until the liquid level reaches the tube at which time the gas in the tube liquifies causing the bellows to contract, and a valve mechanism is associated with the movable end of the bellows causing interruption of the delivery of cryogenic liquid to the vessel.

The valve mechanism which is operated by the bellows preferably includes a pneumatically operated valve and a control valve where the control valve applies to the pneumatically operated valve the overhead gas pressure in the supply tank from which the cryogenic liquid is being dispensed. Where the liquid level of cryogenic liquid in the vessel being filled fluctuates either by consumption or evaporation of the cryogenic liquid, the bellows will expand and contract responsive to changes in the liquid level thereby opening and closing the control valve respectively and opening and closing the main cryogenic liquid valve. In this manner, the apparatus provides positive liquid level control with a self contained pneumatic servo system which prevents delivery of excess cryogenic liquid during partially opened conditions of the liquid valve.

A removable automatically operable latch member is mounted adjacent to the movable end of the bellows. When the latch member is in place, it automatically obstructs expansion of the bellows when the bellows moves to its contracted position thereby locking the dispensing apparatus in a valve closed position each time the dispensing apparatus shuts off after filling a vessel.

When the latch member is removed or locked in its unlatched position, the apparatus opens and closes automatically to maintain a constant liquid level in the vessel being filled.

Other features and advantages of the invention will become apparent from the following description read in conjunction with the attached drawings in which:

Description of drawings

FIG. 1 is a side elevational view partially schematic and partially in section illustrating the condition of the apparatus of this invention when the apparatus is in a condition dispensing cryogenic liquid;

FIG. 2 is a view similar to FIG. 1 showing the condition of the apparatus when it has completed the dispensing of cryogenic liquid, and FIG. 3 is a sectional view taken along the plane indicated at 3—3 in FIG. 1 and illustrating in phantom outline the position of corresponding parts in FIG. 2.

Detailed description

Referring now in detail to the drawing and particularly to FIG. 1 the dispensing apparatus includes a pressurized container 10 which is a conventional container employed in storing and transporting cryogenic liquids such as liquid nitrogen and liquid oxygen. The container 10 has an interior conduit 12 extending to the bottom of the container and connected through a manual valve 14 to a discharge conduit 16. A vent conduit 18 having a manually operable valve 20 is connected to the interior of the container 10 above the liquid level, that is in communication with the pressurized gas in the head space in the container.

A pneumatically operated filling valve having a housing 22 has its intake port 24 connected to the conduit 16 and its outlet port 26 connected to a conduit 28 which may be connected to the container 30 which is to be filled with cryogenic liquid. The housing 24 has a vent port 32 in its lower end and a chamber 34 with a control port 36 at its upper end. A movable valve element is mounted in the housing 22 and has an elongated stem 38 carrying an upper piston 40 and lower valve pistons 42, and a spring 44 is mounted before the piston 42 for urging the piston 42 to the valve closed position illustrated in FIG. 2.

The lower valve piston 42 is properly positioned to be interposed between the inlet and outlet ports 24 and 26 in the valve closed position illustrated in FIG. 2, and when pressurized fluid is delivered to the control port 36, pressure on the piston 40 moves the valve stem 38 and valve pistons 42 downwardly to the valve open position illustrated in FIG. 1.

A control valve having a housing 46 is mounted on a frame 48. A portion 46A of the housing 46 is threaded into the remainder of the housing 46. An expandable bellows 50 is also mounted on the frame 48 by means of a portion 48A of the frame 48, and the frame 48 may be mounted on any suitable support 52 or in the alternative the frame 48 may take the form of a single rigid connection between the housing 46 and the frame portion 48A.

The housing 46 has an inlet 52 connected to the conduit 18 and a lateral outlet 54 connected by a conduit 56 to the control port 36 of the valve 22.

The housing portion 46A has an internal annular web 58 provided with a valve port 60 between the inlet 52 and the outlet 54. A movable valve element having a central stem 62 and a conical valve seat 64 is mounted inside the housing 46 with the stem 62 extending through the port 60 and with a spring 66 urging the valve element to a position where the valve annulus 64 closes the port 60. A second annulus 68 is provided on the valve stem 62 between the central web 58 and the bellows 50.

The control valve 46 has a passageway 70 in its end opposite the inlet 52 and aligned with the stem 62. A vent tube 72 is mounted in the housing 46 extending through the port 70 with the tube carrying a peripheral flange 74 engaging a spring 76 by which the vent tube is urged to the right as viewed in FIG. 1 when the bellows 50 contracts. The vent tube 72 is provided with lateral vent ports 78 which are so positioned that they will pass through the end wall of the control valve as the bellows 50 contracts to a position where the vent ports are outside of the housing 46 (FIG. 2) thereby venting the interior of the tube 72. The inner end of the tube 72 engages the annulus 68 in the condition of the apparatus illustrated in FIG. 1 so that the tube 72 provides a vent to the interior of the housing 46 in the condition in FIG. 2, but this vent is closed in the condition of the apparatus in FIG. 1 both by reason of the engagement of the end of the tube 72 with the annulus 68 and by reason of movement of the vent ports 78 to a position inside the housing.

A flexible metal tube 80 has one end thereof closed as at 82 and positioned in the vessel 30 at the liquid level to which the vessel is to be filled. The other end of the tube 80 communicates with the interior of the bellows 50, and the tube 80 and bellows 50 are filled with a gas having a boiling point between the boiling point of the cryogenic liquid 84 and the tank 10 and normal ambient temperature as explained above.

A latch member 86 having the form of a horseshoe washer is mounted within the frame 48 in a position where it rests upon the top of the free end of the bellows 50 in the condition of the apparatus in FIG. 1, but when the bellows 50 contracts to the position of the apparatus in FIG. 2, the latch 86 falls to the position illustrated in FIG. 2 where it obstructs repeated movement to the left of the free end of the bellows. In the condition of the apparatus in FIG. 2 the dispensing apparatus is locked in a valve closed position. If the temperature sensing tube 80-82 is removed from the cryogenic liquid in the vessel 30, the gas in the tube will boil and increase the vapor pressure in the bellows 50, but the bellows 50 is unable to expand due to the obstruction placed in front of it. As best seen in FIG. 3, the latch member 86 may be rotated ninety degrees and removed from its position permitting automatic operation of the device. Preferably the apparatus is mounted in a suitable casing having a "reset" button where the reset button may be pushed to manually move the latch member 86 from its position of FIG. 2 to its position of FIG. 1 opening the valve with the reset button provided with a manual lock so that it may be locked holding the latch member 86 in the position of FIG. 1.

When the apparatus is in a liquid dispensing condition as illustrated in FIG. 1, gas pressure in the top of the container 10 forces the liquid 84 upwardly through the tube 12 hence through the port 24 and port 26 into the vessel 30. This condition continues automatically until the level of cryogenic liquid in the vessel 30 contacts the end of the tube 82 at which time the gas in the tube rapidly liquifies causing the bellows 50 to contract and move to the position illustrated in FIG. 2. As the bellows contracts, spring 76 forces the vent tube 72 to the right, and spring 66 causes the valve stem 62 and annulus 68 to follow the tube 72 until the valve annulus 64 closes the valve port 60. Additional movement of the tube 72 to the right causes the interior of the housing 46 to be vented through the tube 72 and the vent ports 78, and the venting of the interior of control valve 46 vents the conduit 56 in the top of the valve 22 so that the spring 44 pushes piston 42 upwardly thereby closing the main liquid valve 22.

At this time, the latch member 86 drops into place preventing subsequent expansion of the bellows 50 so that the apparatus dispenses no more cryogenic liquid until the latch member 86 is manually engaged and lifted from the position of FIG. 2 to the position of FIG. 1. If the latch member 86 is removed or locked in its upper position, the bellows will again expand and cause the valve 22 to open again as soon as the liquid level drops below the end 82 of the tube 80.

When the latch 86 is in its upper position as illustrated in FIG. 1 and when the liquid level in the vessel 30 drops below the end 82 of the tube 80, the liquid in the tube 80 boils to cause the bellows 50 to expand and thereby push the vent tube 72 to the left as illustrated in FIG. 1. Movement of the vent tube 72 causes the vent port 78 to enter the housing 46 and also causes the end of the vent tube 72 to engage the annulus 68 and unseat the valve annulus 64 from the valve port 60. As this valve opens, pressurized gas from the head space in the tank 10 flows through the conduit 18 and valve port 52 and hence through the valve ports 60, 54 and 36 into the chamber 34 in the top of the liquid control valve 22 to cause the valve to move from its valve closed position of FIG. 2 to its valve open position of FIG. 1 where the apparatus again dispenses liquid to repeat the cycle.

While a specific embodiment of the invention has been illustrated and described in detail herein it is obvious that many modifications thereof may be made without departing from the spirit and scope of the invention.

I claim:

1. Apparatus for filling vessels to a predetermined liquid level with a cryogenic liquid which comprises:
   (A) A container containing a body of said cryogenic liquid under pressure,
   (B) A cryogenic valve having
      (1) an inlet port connected to said body of cryogenic liquid,
      (2) an outlet port adapted to be connected to said vessel,
      (3) a valve element movable between valve open and closed positions for alternatively establishing and preventing communication between said inlet and outlet ports, and
      (4) a control port communicating with said valve element for moving said valve element between said open and closed positions responsive to the delivery of pressurized fluid thereto,
   (C) A control valve having
      (1) an inlet port communicating with the interior of said container,
      (2) an outlet port communicating with said control port of said cryogenic valve, and
      (3) movable mechanical valve means movable between open and closed positions for respectively establishing and preventing communication between said inlet and outlet parts, and
   (D) Temperature sensing means having
      (1) a frame
      (2) a movable portion mounted on said frame for movement between first and second positions with said movable portion engaging said mechanical valve means of said control valve for moving said mechanical valve means to said open and closed positions when said movable portion is in said first and second positions respectively, and,
      (3) a temperature sensing portion movably mounted on said frame and adapted to be positioned in said vessel at said predetermined liquid level with said temperature sensing portion connected to said movable portion for moving said movable portion to said second position when said temperature sensing portion senses the temperature of said cryogenic liquid and moving said movable portion to said first position when said temperature sensing portion senses temperature above the temperature of said cryogenic liquid.

2. The apparatus of claim 1 in which said control valve comprises
   (A) A housing having
      (1) said inlet port in one end thereof, (2) said outlet port in a side thereof,
(3) an intermediate wall portion between said inlet and outlet ports and having a valve port therein,
(4) said movable mechanical valve means mounted in said housing with said valve port and a valve annulus on said stem between said inlet port and said valve port, and
(5) an opening in said housing in the end thereof opposite to said inlet and in alignment with said stem, (B) An annular valve seat on said stem between said valve port and said opening, and
(C) A vent tube extended through said opening into engagement with said movable portion of said temperature sensing means and telescopically received on said stem with said tube having
(1) vent ports adapted to communicate with the exterior of said housing,
(2) a valve seat on the end of said tube adapted for sealing engagement with said annular valve seat.

3. The apparatus of claim 2 characterized further by the inclusion of a movable spacer positioned between said control valve and said movable portion of said temperature sensing means with said spacer movable under the influence of gravity when said movable portion is in said second position from an upper position permitting movement of said movable portion to said first position to a lower position obstructing movement of said movable portion to said first position.

4. Apparatus for filling a vessel to a predetermined liquid level with a cryogenic liquid which comprises
(A) A container containing a body of said cryogenic liquid under pressure with said container having a liquid discharge conduit,
(B) Valve means having an inlet connected to said liquid discharge conduit, an outlet adapted to communicate with said vessel, and a movable valve element movable between a valve closed position preventing liquid flow between said inlet and outlet and a valve open position permitting liquid flow between said inlet and outlet,
(C) A frame portion mounted in fixed space relation with respect to said valve means,
(D) A movable portion mounted on said frame adjacent to at least a part of said valve means and movable toward said valve means from a first position to a second position for moving said movable valve element from said closed position to said open position,
(E) An expandable bellows mounted on said frame and connected to said movable portion for moving said movable portion from said first position to said second position as said bellows expands,
(F) A flexible tube connected to said bellows with said tube having one end thereof closed and adapted to be positioned in said vessel at said predetermined liquid level and the other end thereof communicating with the interior of said bellows,
(G) A body of gas in said tube and bellows with said body of gas having a boiling point which is between ambient temperature and the boiling point of said cryogenic liquid, and
(H) A latch member mounted on said frame for automatic movement from an unlatching position to a latching position when said movable portion is in said first position with said latch member in said latching position preventing movement of said movable portion to said second position.

References Cited

UNITED STATES PATENTS 3,307,367  3/1967  Klipping et al. _____ 62—49

HOUSTON S. BELL, Jr., *Primary Examiner.*

U.S. Cl. X.R.

62—49; 141—198; 251—113